(12) United States Patent
Devine et al.

(10) Patent No.: US 9,203,219 B2
(45) Date of Patent: Dec. 1, 2015

(54) BOOM MOUNTABLE ROBOTIC ARM

(71) Applicant: Daniel Neil O'Connell, Oliver (CA)

(72) Inventors: Clifford William Devine, Osoyoos (CA); Daniel Neil O'Connell, Oliver (CA)

(73) Assignee: QUANTA ASSOCIATES LP

( * ) Notice: Subject to any disclaimer, the term of this patent is extended or adjusted under 35 U.S.C. 154(b) by 1 day.

(21) Appl. No.: 14/231,280

(22) Filed: Mar. 31, 2014

(65) Prior Publication Data

US 2014/0209843 A1   Jul. 31, 2014

Related U.S. Application Data

(60) Division of application No. 13/374,057, filed on Dec. 9, 2011, now Pat. No. 8,684,333, which is a continuation-in-part of application No. 12/451,492, filed as application No. PCT/CA2007/000834 on May 16, 2007, now Pat. No. 8,226,069, said application No. 13/374,057 is a continuation-in-part of application No. 12/227,834, filed as application No. PCT/CA2006/000909 on Jun. 2, 2006, now Pat. No. 8,573,562.

(51) Int. Cl.
*H02G 1/08* (2006.01)
*H02G 1/02* (2006.01)
*H02G 1/04* (2006.01)
*G08C 19/16* (2006.01)

(52) U.S. Cl.
CPC . *H02G 1/02* (2013.01); *H02G 1/04* (2013.01); *G08C 19/16* (2013.01)

(58) Field of Classification Search
CPC ........... H02G 1/04; H02G 1/02; B65H 57/14; H01R 4/64; B66D 3/046

USPC ....... 254/134.3 PA, 134.3 R, 134.5; 269/903; 182/2.1–2.4; 248/288.11, 289.13, 248/291.1, 292.11; 29/755
See application file for complete search history.

(56) References Cited

U.S. PATENT DOCUMENTS

| 60,086 | A | * | 11/1866 | Fracker | 248/291.1 |
| 800,636 | A | * | 10/1905 | Fancher | 237/79 |
| 1,580,571 | A | * | 4/1926 | Putzke | 254/418 |
| 2,662,730 | A | * | 12/1953 | Crawford | 254/134.3 PA |
| 3,005,512 | A | * | 10/1961 | Vogan | 182/2.4 |

(Continued)

FOREIGN PATENT DOCUMENTS

EP    1030321 A1 *  8/2000  ............... H01G 2/18

*Primary Examiner* — George Nguyen
(74) *Attorney, Agent, or Firm* — Antony C Edwards (57) ABSTRACT

A boom mountable robotic arm for includes a beam pivotally mounted on a boom mounting adaptor, at least two electrically insulated support posts mounted to and spaced apart along the beam, and at least a first rotation coupling and a plurality of second rotation couplings. The first rotation coupling provides pivotal mounting of the beam on the boom mounting adaptor so as to provide selectively controllable rotation of the beam in a substantially vertical plane. The second rotation couplings provide selectively controllable rotation of the electrically insulated support posts about corresponding second axes of rotation between a retracted position substantially laid flush along the beam and a pick-up position ready to receive a conductor being supported. An actuated scissor linkage is mounted to the beam and the boom mounting adaptor for selectively adjusting an angular position of the beam relative to the boom mounting adaptor.

28 Claims, 11 Drawing Sheets

(56) References Cited

U.S. PATENT DOCUMENTS

| | | | | |
|---|---|---|---|---|
| 3,043,394 A | * | 7/1962 | Hall | 182/2.4 |
| 3,356,413 A | * | 12/1967 | Radke et al. | 297/300.3 |
| 3,631,939 A | * | 1/1972 | Johnson et al. | 182/2.4 |
| 3,756,442 A | * | 9/1973 | Wagenblast et al. | 414/421 |
| 4,194,723 A | * | 3/1980 | Grove et al. | 254/9 C |
| 4,353,399 A | * | 10/1982 | Harris | 144/2.1 |
| 4,502,505 A | | 3/1985 | Moller | |
| 4,838,381 A | * | 6/1989 | Michaud et al. | 182/2.3 |
| 4,852,856 A | * | 8/1989 | Correll | 254/134.3 R |
| 5,014,863 A | * | 5/1991 | Vlaanderen | 212/299 |
| 5,054,725 A | * | 10/1991 | Bucefari et al. | 248/123.11 |
| 5,062,227 A | * | 11/1991 | De Gier et al. | 37/406 |
| 5,076,449 A | * | 12/1991 | Clutter | 212/283 |
| 5,193,897 A | * | 3/1993 | Halsey | 362/118 |
| 5,268,591 A | * | 12/1993 | Fujimoto | 307/9.1 |
| 5,601,270 A | * | 2/1997 | Chen | 248/454 |
| 5,791,639 A | * | 8/1998 | Johnston et al. | 269/41 |
| 5,934,414 A | * | 8/1999 | Staczek | 187/269 |
| 5,941,507 A | * | 8/1999 | Page | 254/134.3 PA |
| 5,944,138 A | * | 8/1999 | Vollmer et al. | 182/2.1 |
| 6,082,552 A | * | 7/2000 | Pollock et al. | 211/18 |
| 6,286,812 B1 | * | 9/2001 | Cherry | 254/9 C |
| 6,702,130 B1 | * | 3/2004 | Carlilse | 211/204 |
| 6,948,701 B2 | * | 9/2005 | Knoerzer et al. | 254/134.3 FT |
| 7,216,850 B2 | * | 5/2007 | Kwon | 254/395 |
| 8,226,069 B2 | * | 7/2012 | Devine et al. | 254/134.3 PA |
| 8,684,333 B2 | * | 4/2014 | Devine et al. | 254/134.3 PA |
| 2005/0189527 A1 | * | 9/2005 | Young | 254/134.3 R |
| 2008/0008572 A1 | * | 1/2008 | Ruhlander et al. | 414/545 |
| 2008/0224108 A1 | * | 9/2008 | O'Connor | 254/134.5 |
| 2010/0123108 A1 | * | 5/2010 | Holley et al. | 254/98 |
| 2010/0237211 A1 | * | 9/2010 | Vigil | 248/291.1 |
| 2012/0319063 A1 | * | 12/2012 | Hailston et al. | 254/2 C |

* cited by examiner

BOOM MOUNTABLE ROBOTIC ARM

CROSS REFERENCE TO RELATED APPLICATIONS

This application is a divisional of U.S. patent application Ser. No. 13/374,057 entitled Boom Mountable Robotic Arm filed Dec. 9, 2011 which is a continuation in part from: (a) U.S. application Ser. No. 12/451,492 filed Nov. 16, 2009 and issued on Jul. 24, 2012 as U.S. Pat. No. 8,226,069, which is a national phase entry from PCT application number PCT/CA2007/000834 filed May 16, 2007, both entitled Boom Mountable Robotic Arm; and, (b) U.S. patent application Ser. No. 12/227,834 filed Nov. 28, 2008 and issued on Nov. 5, 2013 as U.S. Pat. No. 8,573,562, entitled Remote Manipulator for Manipulating Live Multiple Sub-Conductors in a Single Phase Bundle, which is a National Phase Entry from PCT application No. PCT/CA2006/000909 filed Jun. 2, 2006, entitled Remote Manipulator for Manipulating Live Multiple Sub-Conductors in a Single Phase Bundle, and which all are incorporated herein in their entirety.

FIELD OF THE INVENTION

This application relates to a robotic arm which is mountable to the boom of a service vehicle for temporarily supporting and repositioning energized power lines to enable repair or replacement or re-location of transmission or distribution conductors while energized.

BACKGROUND OF THE INVENTION

High voltage transmission and distribution lines are typically strung between a series of spaced-apart support towers or poles. The conductors are connected to insulators mounted or suspended from crossarms extending at the upper end of transmission or distribution poles, or conductor support points built into transmission towers. Periodically it is necessary to replace or repair the poles or towers, crossarms and insulators to maintain the electrical circuit in good working order. It is preferable if this maintenance and repair work can be performed without de-energizing the conductors in order to avoid the necessity of purchasing power from an alternative source, or other system disruptions.

Hot line repair work is a potentially hazardous undertaking. Safety regulations require that linemen maintain a minimum work clearance or "limit of approach" from energized conductors. The limit of approach varies depending upon the voltage of the conductors in question.

Conventional procedures used by linemen to temporarily support energized conductors in order to enable repair of damaged or obsolete components involve the use of insulated wire tongs, lift poles and rope blocks in labor-intensive, complex rigging arrangements. Conventional fiberglass insulated tools are limited to use only in good weather. Any accumulation of moisture which may impair their insulating property requires that the job be stopped, and that all and that the conductors be placed in an insulator which is rated for all-weather use.

Several auxiliary crossarms have also been proposed in the past for temporarily supporting conductors, thereby reducing the need for labor-intensive "stick work" by linemen. For example, U.S. Pat. No. 4,973,795, which issued to Sharpe on Nov. 27, 1990, relates to an auxiliary crossarm consisting of an insulated boom fitted with polymer insulators and conductor hooks for releasably engaging energized conductors. The Sharpe boom is suspended from a crane above the transmission lines to be serviced.

Auxiliary crossarms for temporarily lifting and supporting energized conductors from below are also well-known. Such crossarms typically have sleeves which are compatible to the boom jibs of derrick and bucket trucks.

Utility companies often find it convenient to string both transmission lines and distribution lines on the same pole or tower. The distribution lines are usually suspended between four to twelve feet below the transmission lines.

This makes it very difficult or impossible to safely raise prior art boom-mounted auxiliary crossarms to a position immediately beneath the transmission lines in order to provide temporary support to the lower mounted distribution conductors.

Another limitation of prior art designs such as that found in applicants U.S. Pat. No. 5,538,207 which issued Jul. 23, 1996, is that they do not permit extensive pivotal movement of the auxiliary crossarm relative to the boom of a service vehicle. A large range of pivotal movement is desirable so that no matter what the orientation of the service vehicle, for example when parked on rough uneven terrain, movement of the auxiliary crossarm easily facilitates simultaneous multiphase conductor capture, and enables insertion of the crossarm between upper and lower-mounted conductors no matter what the angle of the service truck, and to allow for relocation of conductors to different final configurations or different orientations. Fold-down-flat insulators make for compactness, for example when the auxiliary cross-arm is flush down against the boom of transport, and for insertion into tight spacing between existing conductors and crossarms.

SUMMARY OF THE INVENTION

In the summary, the boom mountable robotic arm for temporarily supporting an elongate conductor may be characterized according to one aspect of the invention as including a beam pivotally mounted on a boom mounting adaptor, wherein the boom mounting adaptor is mountable onto an upper end of a boom. At least two electrically insulated support posts are mounted to and spaced apart along the beam. At least a first rotation coupling and second rotation couplings which are collectively mounted in cooperation with the beam. The first rotation coupling provides pivotal mounting of the beam on the boom mounting adaptor so as to provide selectively controllable rotation of the beam about a first axis of rotation, wherein the first axis of rotation extends laterally of and between the beam and an upper end of the boom mounting adaptor for rotation of the beam relative to the boom mounting adaptor in a substantially vertical plane. The second rotation couplings provide selectively controllable rotation of the electrically insulated support posts about corresponding second axes of rotation. The second axes of rotation include axes of rotation extending substantially laterally across the beam at base ends of the support posts for rotation of each support post relative to and substantially along the beam. Positions of the support posts are thereby selectively adjustable between a retracted position substantially laid flush along the beam and a pick-up position ready to receive a conductor being supported. Each electrically insulated support post is adapted to temporarily support an energized electrical conductor.

A scissor linkage is mounted to the beam and the boom mounting adaptor for selectively adjusting an angular position of the beam relative to the boom mounting adaptor. A selectively actuable first actuator is mounted so as to cooperate between the beam and the scissor linkage. The scissor linkage includes first and second linkage members. Each of the first and second linkage members has, respectively, opposite first and second ends. The first ends are pivotally connected to one another. The second ends are pivotally mounted to, respectively, the beam and the boom mounting adaptor. The first actuator is pivotally mounted at a first end thereof to the first ends of the linkage members. A second end of the first actuator, opposite the first end of the first actuator, is mounted to the beam.

The beam is pivotable in an angular displacement about the first rotation coupling by substantially 160 degrees relative to the boom mounting adaptor. The angular displacement includes a substantially horizontal orientation and a substantially vertical orientation.

The beam may be a substantially linear beam. The at least two electrically insulated support posts include one or more insulated support posts mounted on each of the opposite ends of the beam. The support posts on each end of the beam are mounted on corresponding second rotation couplings on the opposite ends of the beam. The second rotation couplings have corresponding substantially parallel the second axes of rotation allowing distal ends of the pair of support posts, distal from the beam, to rotate in a substantially vertical plane into the support posts' retracted positions.

The second axes of rotation may also include axes which extend along the beams so that the posts rotate laterally relative to the beam, and may also include axes which extend vertically or off-vertically so that the posts rotate while upstanding, or wherein the second axes of rotation are a combination of these by the use of a universal joint-like coupling or other forms of multiple degree-of-freedom couplings between the posts and the beam.

The second rotation couplings may each include a hinge mounted to the beam. Each hinge may include at least one hinge plate. Each hinge plate may have a plurality of bores therein for securing a corresponding pair of electrically insulated support posts thereto. Each hinge plate may have a fastener for securing the hinge plate in an operating position in which the electrically insulated support posts extend in their pick-up positions and substantially perpendicularly away from the beam.

Each hinge plate may be pivotally mounted to a corresponding base plate which is mounted to the beam. The hinge plate and its corresponding base plate may have cooperating holes at opposite ends thereof so that, with a first end of the hinge plate pinned by a pin or rod or shaft to the first end of the base plate, the opposite second end of the hinge plate may be swung or pivoted open relative to the base plate by rotation of the plates about the pin, rod or shaft. Conversely, the second ends of the hinge plate and base plate may be pinned together for opening or pivoting open of the hinge in the opposite direction, that is, about the pin, rod or shaft pinning the second end of the hinge plate to the second end of the base plate.

The beam may include telescopic beam extensions and a second actuator cooperating between the beam and the beam extensions for selective lengthening of the beam, and wherein the support posts are mounted on distal ends of the beam extensions. The beam may include a main beam member and one extension member at at least one end of the main beam member. The extension member extends so as to elongate the beam. At least one electrically insulated support post is mounted on a distal end of the extension member, distal from the main beam member. An oppositely disposed pair of the extension members may be mounted on the distal ends of the main beam member. The extension members extend from a collapsed position to an extended position. The pair of support posts on the distal ends of the extension members pivot on the support posts' corresponding second rotation couplings so as to, for example, fold along the main beam member when the extension members are in their collapsed position, that is, when the beam is shortened. The individual or pairs of support posts on the distal ends of the extension members may pivot towards one another when pivoted about the second rotation couplings into their retracted positions. At least a third support post may be mounted on the main beam member. The third support post is pivotable about a corresponding second rotation coupling so as to, for example, lay flush along the main beam member when the third support post is in the retracted position. When in the retracted position the third support post is advantageously substantially co-linearly aligned with and between the first and second support posts when in their corresponding retracted positions.

Static picks may be mounted to the main beam between the support posts so as to extend substantially perpendicularly from the beam, and may also be mounted by second rotation couplings to, for example, pivot along the beam.

Angular positioners may be mounted acting between the posts and/or picks for adjusting the inclination angle of the posts or picks about the second rotation coupling on the beam. The angular positioners may be rigid positioners for example using links of different lengths to selectively tip or pivot the posts or picks about their hinges by set angles such as for example 15°, 30°, 45°, etc.

Alternatively, instead of the use of links holding the hinges open, that is, mounted between the open ends of the open hinges, the hinges may be selectively pivoted between their open-most and their closed positions, or otherwise the posts or picks may pivoted about second rotational couplings such as pinned joints, rotational sleeves, shafts and bearings, universal joints, ball-joints, etc as would be known to those skilled in the art, by the use of actuators such as for example hydraulic cylinders cooperating between the posts or picks and the beam.

In the various embodiments, the posts may be single posts mounted one post per hinge or pivot, or the posts may be multiple posts, for example, pairs of posts mounted one pair or group of posts per hinge or pivot.

The opposite first and second ends of the main beam member define a beam length there-between. The first rotation coupling is adjacent the first end of the main beam member. The second end of the first actuator is mounted adjacent to the second end of the main beam member. The first actuator may be a linearly extensible actuator which selectively extends between a shortened length and a long length corresponding to retraction and extension of the first actuator respectively. The first and second linkage members have corresponding first and second lengths. The first or second lengths of the first and second linkage members when summed with, that is, added to, the shortened length of the first actuator, is substantially no longer than the beam length.

When the first actuator is retracted into its shortened length, the first actuator pulls on the first ends of the first and second linkage members so as to reduce an included angle between the first and second linkage members to thereby rotate the second end of the main beam member towards the boom mounting adaptor. The boom mounting adaptor may be elongate. First and second included angles are formed between the first end of the main beam member and the boom mounting adaptor, and between the second end of the main beam member and the boom mounting adaptor respectively. The first included angle is increased and the second included angle is decreased as the second end of the main beam member rotates towards the boom mounting adaptor. When said first actuator is retracted and thereby in its shortened length, the included angle between the first and second linkage members is minimized and the main beam member is rotated about said first rotation coupling so as to be substantially flush along the linkage members, the first actuator, and the boom mounting adaptor. The beam and the support posts may thereby be compactly stowed when the boom is in a lowered position.

BRIEF DESCRIPTION OF THE DRAWINGS

In drawings which illustrate embodiments of the invention, but which should not be constructed to limit the spirit or scope of the invention.

DETAILED DESCRIPTION OF EMBODIMENTS OF THE INVENTION

U.S. Pat. No. 5,538,207 is incorporated herein by reference.

The robotic arm 20 discussed herein is adapted to provide a very large range of motion for servicing, by the arm, of energized electrical high voltage lines or conductors. Robotic arm 20 is mountable on the boom 22 of a service vehicle by means of a boom adaptor 24. Boom adaptor 24 preferably includes an insulated section which mounts onto the upper end of boom 22. This permits the use of non-insulated booms 22. A scissor-linkage 26 is interposed between boom adaptor 24 and beam or upper frame 28 which preferably consists of an elongated tube and is pivotally connected to the end of boom adaptor 24 by means of a pivot joint 30. Boom adaptor 24 is connected towards one end of upper frame 28.

Actuator 32 extends between boom adaptor 24 and upper frame 28 and is mounted at one end to the upper frame 28 and at the other end to the elbow 26a of scissor-linkage 26 for adjusting the angular position of upper frame 28 within substantially a 160 degree range of motion within a substantially vertical plane. Extension and retraction the actuating rod 32a of actuator 32 is actuated by hydraulic cylinder 32b. Insulators 34 are mounted on upper frame 28 by means of pivoting hinges 28a. One or more insulators 34 may be mounted on each hinge 28a. Hinges 28a allow insulators 34 to be for example laid flat along on top of, and flush against upper frame 28.

In an alternative embodiment, robotic arm 20 may, although this is not intended to be limiting, further include first and second telescoping arms 36, 38 which are telescopically coupled to opposite ends of upper frame 28. As discussed further below, each telescoping arm 36, 38 is independently adjustable between a retracted position and an extended position coaxial with upper frame 28. Movement of telescoping arms 36, 38 is preferably actuated by hydraulic cylinders housed within upper frame 28. Alternatively, threaded rods powered by hydraulic motors, worm gears, or other suitable mechanical actuators could be employed.

Insulators 34 are mounted as a parallel series or parallel array on the upper surface of upper frame 28 and may also be mounted on telescoping arms 36, 38 if telescoping arms are employed. Insulators may be mounted in pairs 34a, 34b and 34c or may be mounted singlely or in groups of more than two. A conductor holder 40 is mounted at the upper end of each insulator 34 for releasably coupling robotic arm 20 to a corresponding energized conductor. The number of insulators 34 and corresponding conductor holders required depends upon the number of transmission and/or distribution conductors in question. Further, the length of insulators 34, and the coupling together, for example on pairs, of more than one insulator 34, is determined by the mechanical arrangement of the conductors and the voltage level at which they are operating.

The centre conductor of a three phase transmission line often extends above the two outside conductors. Accordingly, the centre insulator 34, that is, the insulator stack mounted between the ends of upper frame 28 may be longer in length than the insulator stacks mounted on the ends of the beam, for example on the ends of telescoping arms 36, 38 or an example may consist of two insulators 42 bolted together for extra length. Insulators 34 preferably consist of station class polymer insulators which are rated for all weather use.

Robotic arm 20 is controlled remotely by an operator so as to control the angular position of upper frame 28 relative to the boom and boom adaptor, and the position of telescoping arms 36, 38 if they are included. The control system may consist of hydraulic hose (not shown) connected to the auxiliary port of the service vehicle hydraulic system and valving for controlling the operation of hydraulic cylinder 32b. Alternatively, the operation of hydraulic cylinder 32b may be remotely controlled by means of digital radio signals, fiber optic cables, or other suitable insulated control means. The remote operator may be positioned for example in a bucket secured to the service vehicle boom on transmission tower, on the deck of the service vehicle, or on the ground.

In operation, robotic arm 20 is first mounted on boom 22 of the service vehicle described above. The hydraulic hoses (if any) are then connected to the auxiliary hydraulic port of the service vehicle. The service is typically parked immediately underneath or adjacent to the support tower to be serviced. The truck boom 22 is extended to position arm 20 underneath the energized transmission lines in question. If necessary, boom 22 may be rotated about the turret of the service vehicle until the desired angular position of the boom relative to the vehicle is reached.

Depending upon the angle of boom 22 it may be necessary to actuate hydraulic leveling cylinder 32 until upper frame 28 rotates about pivot joint 30 to a position immediately underneath and parallel to the tower crossarm. Once in the level position, insulators 34 mounted on upper frame 28 (and on telescoping arms 36, 38 if included) are positioned immediately underneath the corresponding transmission lines. The angle, relative to upper frame 28, of the conductor support posts including insulators 34 may be adjusted as better described below to assist in positioning conductor holders 40 under the transmission lines.

Once boom 22 has been extended and conductor holders 40 positioned, linemen working on the tower may then place each energized transmission line into a corresponding conductor holder 40 mounted at the upper end of each insulator 24. Each conductor holder 40 is first positioned below a corresponding conductor. Conductor holders 40 may for example be rotatable about bearing adaptors for alignment with the corresponding conductor irrespective of the orientation of boom 22.

Once the conductors are securely captured within a corresponding conductor holder 40, the linemen manually unties the conductors from the insulator mounted on the tower crossarm. The conductors may then be raised well above the tower by extending boom 22. Additionally, the outside conductor strands may be extended laterally away from the tower by either or both extending telescoping arms 36, 38 if provided, and inclining end insulators 34 outwardly of upper frame 28, by actuators which are independently controllable by actuating corresponding hydraulic cylinders such as would be mounted within on or upper frame 28, or by manually adjusting the extension and/or angling of the beam or insulators respectively. The distance between phases may be extended from, for example, six feet to fourteen or fifteen feet to provide linemen with safe working clearances even in the case of high voltage lines (for example greater than 100 kV).

Robotic arm 20 temporarily supports the weight of the conductors to enable servicing of replacement of conductor support structures, such as the tower, insulators, or crossarms by the linemen. After the required line maintenance has been completed, telescoping arms 36, 38 are retracted to thereby return the outer conductor strands to their original position. The truck boom 22 may the be lowered, if necessary, until upper frame 28 is positioned slightly below the level of the crossarm. The conductors are then retied by the linemen to the tower insulators and the conducting holder latching mechanisms on insulators 34 are opened to complete the servicing procedure.

In some circumstances it is useful to adjust the angular position of robotic arm 20 during the conductor fastening procedure. For example, an outside conductor strand could be connected to a corresponding connector holder 40 and insulator 34 mounted the end of upper frame 28 or on a telescoping arm 36 or 38 while frame 28 is tilted at an angle or vertically, for example to pick up outside conductors which are spaced apart vertically on a tower. Telescoping arms 36, 38 could then be extended or the insulators angled away from the ends of upper frame 28 or arms 26, 38 to move the conductor a safe distance away from the tower to be serviced. In some situations, robotic arm, 20 could then be pivoted as described above until frame 28 is level with the tower crossarm. The remaining conductor lines could be then coupled to robotic arm 20, if necessary. This technique may be suitable, for example, if there is very little clearance between the transmission tower and surrounding structures.

Distribution lines are often strung between support towers a short distance below transmission lines. Both transmission lines and distribution lines may be supported on conductors 34 on upper frame 28.

When the boom truck moves from jobsite to jobsite, and for road travel, the boom 22 is retracted and laid flat down on the deck of the truck. To minimize the size of the retracted load, which includes the boom 22, upper frame 28, and insulators 34, it is advantageous if the upper frame 28 and insulators 34 fold down onto the boom 22 so that the load on the boom truck is as compact as possible.

Figure 1:
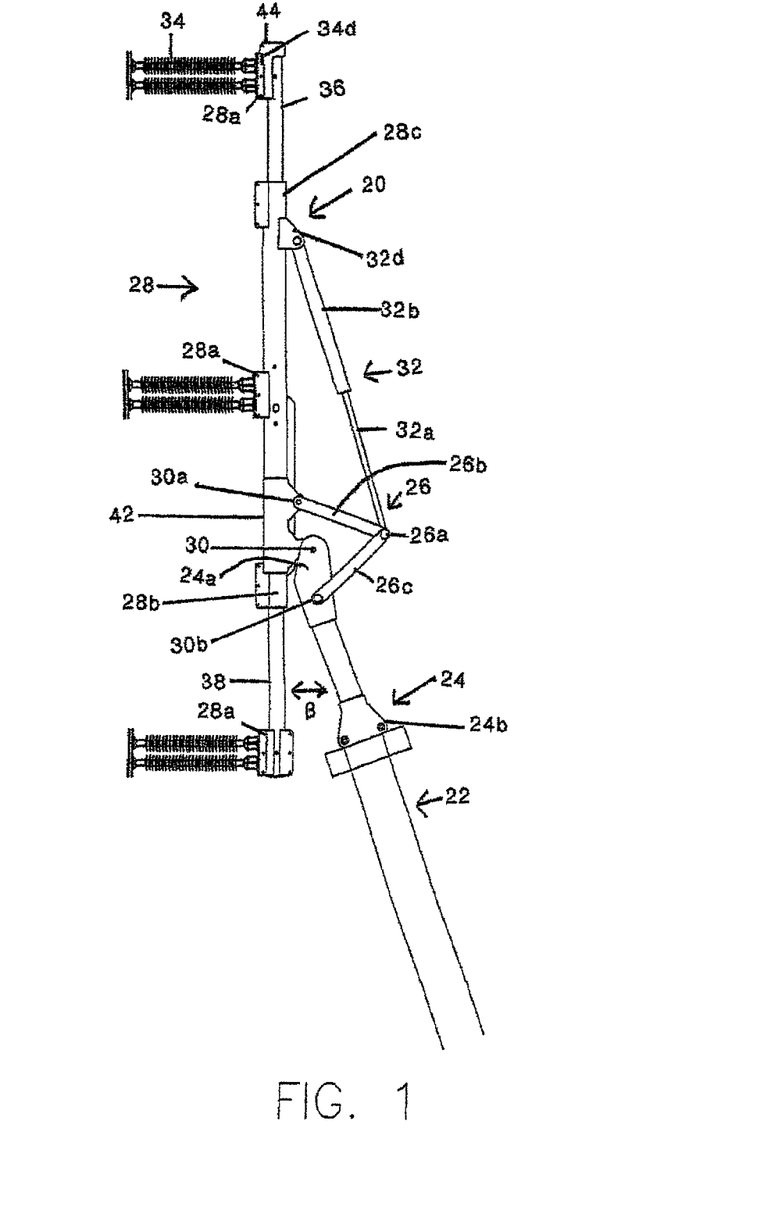
FIG. 1 is, in side elevation view, a boom mountable robotic arm according to one embodiment, wherein the beam on the arm is vertical and the telescopic arm extensions are extended.
Figure 2:
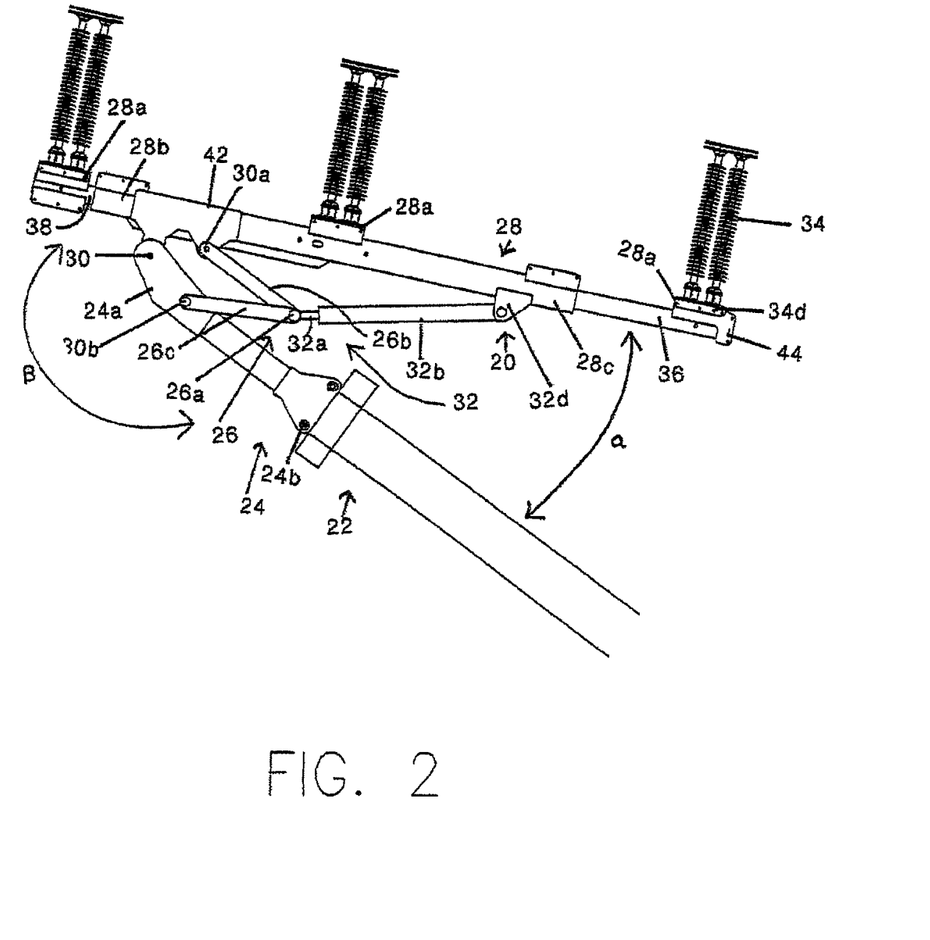
FIG. 2 is the view of FIG. 1 with the beam rotated to the nearly horizontal and with the arm extensions retracted.

When in operation, it is advantageous if the upper frame 28 may be articulated across a large range of motion to thereby allow for situations where the boom truck has to park some distance out from under the conductors to be serviced so that the boom 22 is extended at a considerable angle off the vertical, as seen in FIG. 2, especially where, in order to pick for example three vertically spaced apart conductors, the upper frame 28 has to be rotated to the vertical as seen in FIG. 1.

In a preferred embodiment, an increased range of motion of upper frame 28 relative to boom 22, is achieved by the use of scissor-linkage 26. The range of motion about pivot point 30 is indicated by angles "a" and β. Rigid linkage members 26b and 26c are pivotally pinned together at elbow 26a. The opposite ends of linkage members 26b and 26c are pivotally pinned at hinges 30a and 30b respectively, adjacent base end 28b of upper frame 28 and on the head 24a of boom adapter 24. Linkage members 26b, 26c may be substantially the same length.

One end of actuator 32, illustrated to be the distal end of rod 32a (although this is not intended to be limiting), is pivotally mounted to elbow 26a. The other end of actuator 32, illustrated to be the base end of cylinder 32b, is pivotally mounted to upper frame 28, for example adjacent distal end 28c.

Pivot joint 30 and hinge 30a may be mounted to a pair of mounting plates 42, mounted one on each side of upper frame 28 at base end 28b. In one embodiment linkage members 26b and 26c are each a pair of parallel members spaced apart across the width of upper frame 28. Elbow 26a is a pin or shaft joining the common ends of the pairs of members. The distal end of rod 32a is mounted on the pin or shaft by collar 32c. The base end of cylinder 32b is mounted to upper frame 28 by a pair of plates 32d.

By way the example of FIG. 1, at the limit, or at almost the limit, of the extension of actuator 32, angle β is approximately 20 degrees and angle a is approximately 160 degrees, and scissor linkage 26 is at its most-open, or almost most-open, separation between hinges 30a and 30b. This positions upper frame 28 at the vertical, or substantially the vertical if boom 22 is closer to the vertical, i.e., when the mounting plates 24b of boom adaptor 24 and/or the upper end of boom 22 may interfere with the lowermost end of telescoping arm 38.

Figure 3:
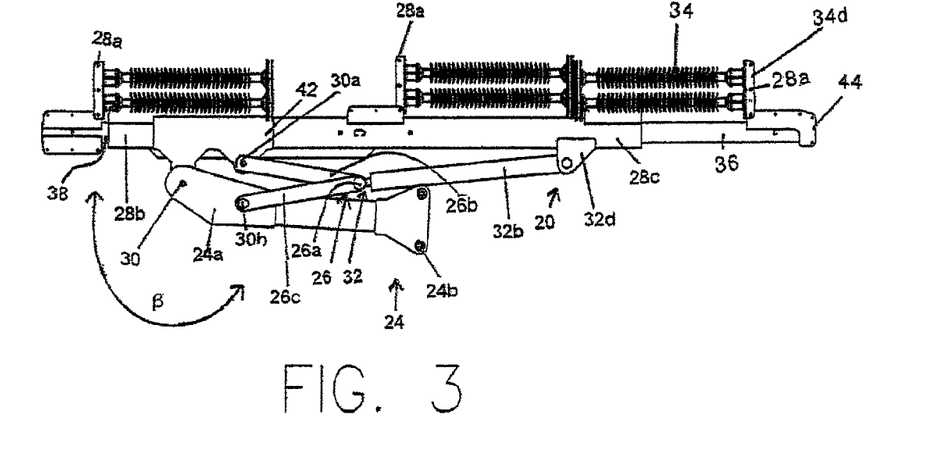
FIG. 3 is the view of FIG. 2 with the beam rotated down flush with the boom adaptor and scissor linkage.

When it is desired to rotate upper frame 28 from its vertical position seen in FIG. 1 (that is, when in use the position to pick-up vertically spaced apart conductors), to its folded down position for storage and travel, actuator 32 is retracted thereby closing the separation of scissor linkage 26 as seen in the progression of FIGS. 2 and 3. In FIG. 3, boom 22 has been lowered to horizontal, and the telescoping arms, if any, telescopically retracted if they were extended, so as to lay the boom down on the deck of the boom truck. Upper frame 28 lies substantially horizontally on and along boom 22. Manually pivotable insulators 34 are folded down onto horizontal upper frame 28 by their pinned or bolted mounts being released, thereby releasing base ends 34d from corresponding pairs of hinge plates 44 mounted on opposite sides of upper frame 28 so that the base ends 34d may pivot about pivoting hinges 28a. Where insulators 34 are inclined by actuators such as actuators 46, illustrated by way of example in FIG. 9, the insulators are laid flat or substantially flat by the actuations of actuators 46.

Advantageously, when three or more insulators 34 are mounted on upper frame 28 and are to be folded or actuated down for storage or travel, the spacing between the base ends 34d is sufficient to allow an adjacent pair of insulators 34 to fold down into an end-to-end alignment such as seen in FIG. 3.

Figure 4:
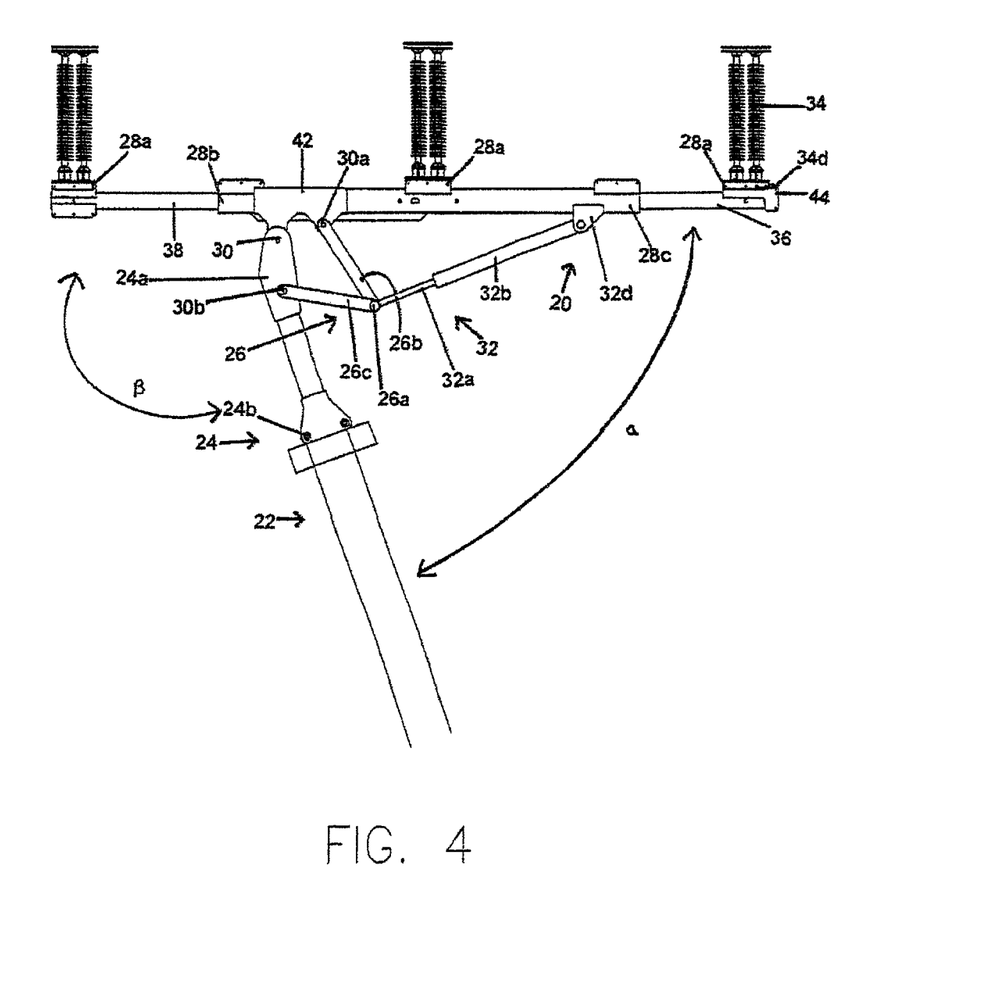
FIG. 4 is the view of FIG. 1 with the arm rotated to the horizontal.
Figure 5:
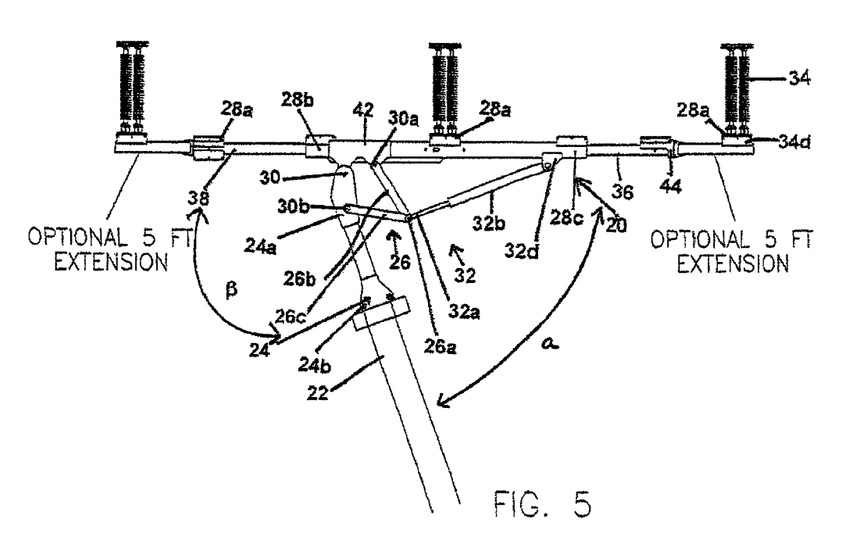
FIG. 5 is the view of FIG. 4 with the optional rigid extensions mounted onto the ends of the telescopic arm extensions.
Figure 6:
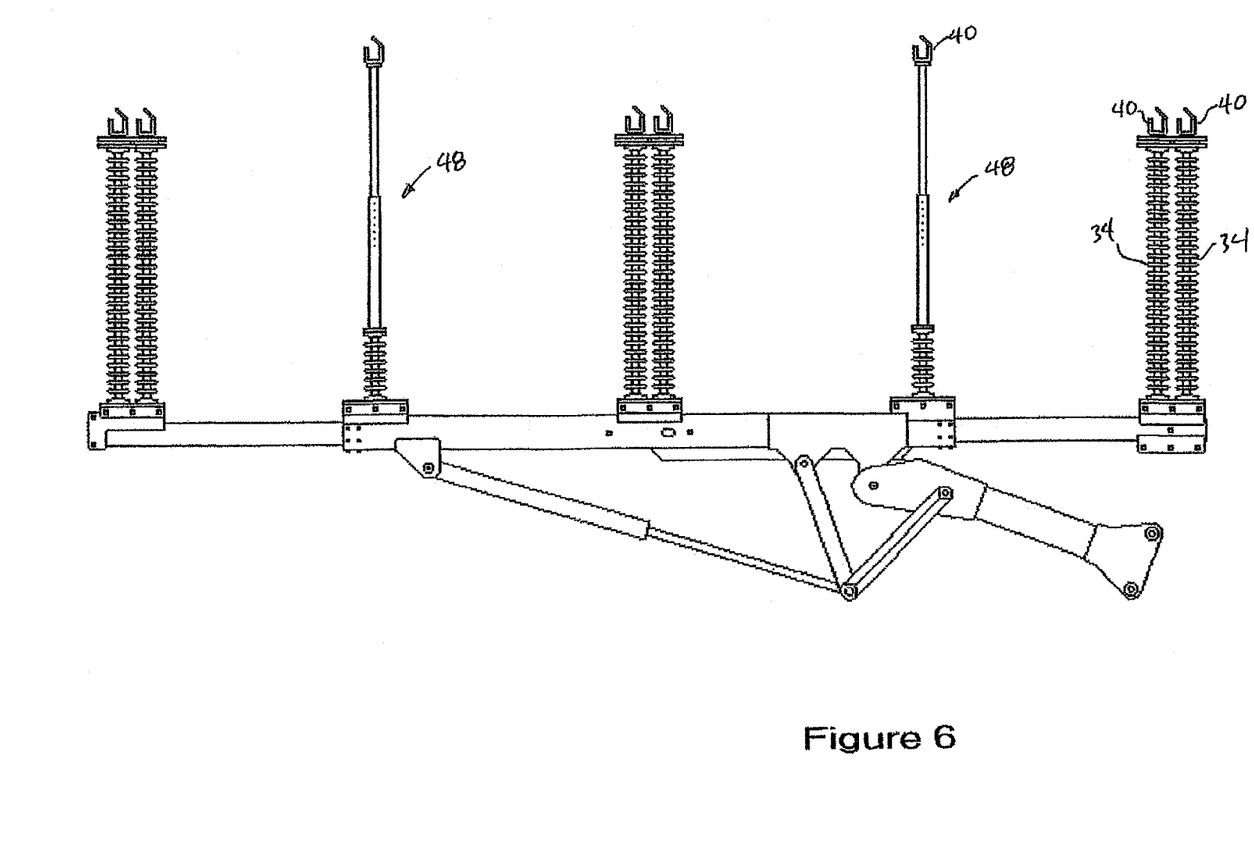
FIG. 6 is, in side elevation view, the boom mountable robotic arm of FIG. 1 further comprising static picks mounted on opposite ends of the upper frame or beam.
Figure 7:
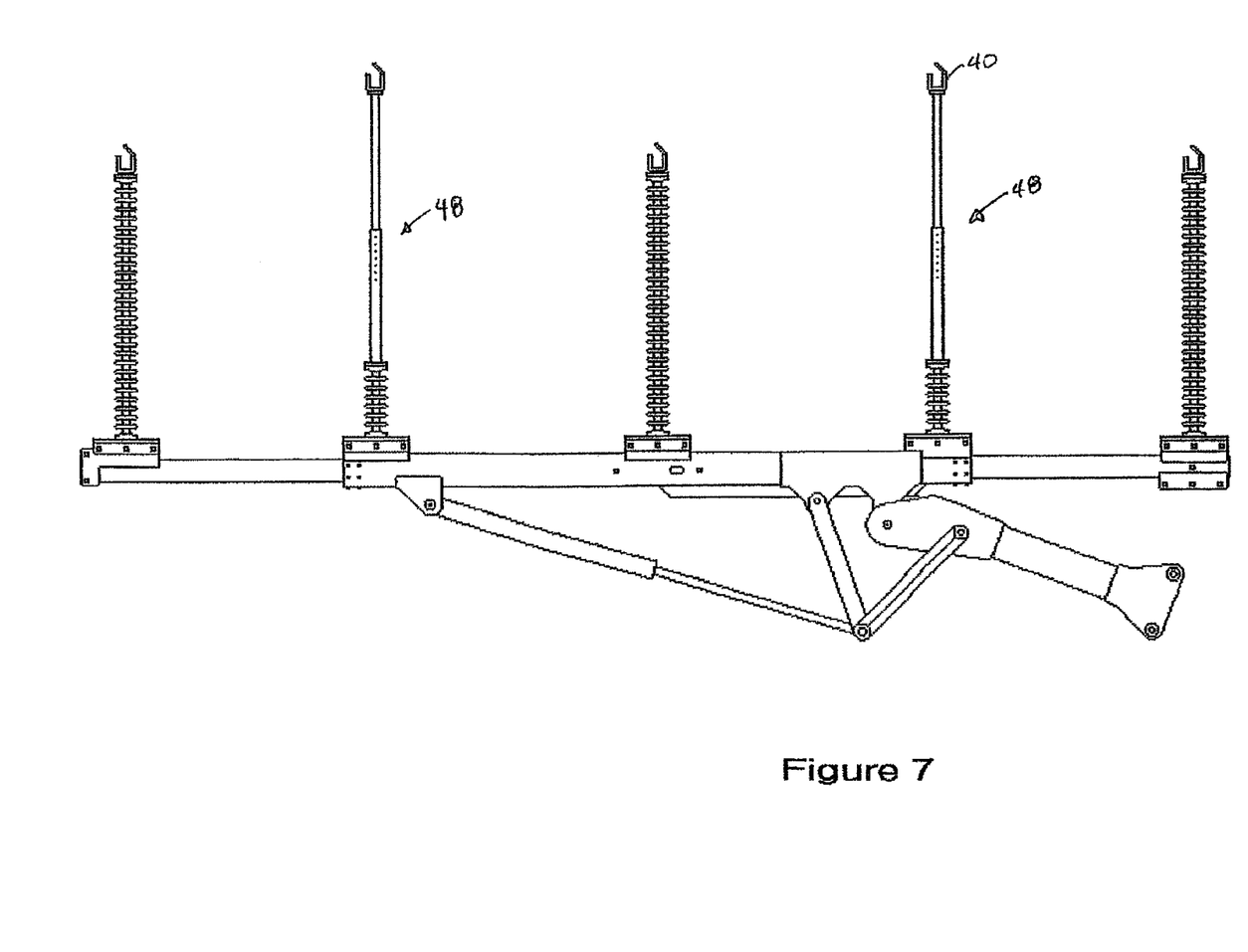
FIG. 7 is the boom mountable robotic arm of FIG. 6 wherein the paired insulators mounted on each hinge have been replaced with single insulators mounted on each hinge.
Figure 8:
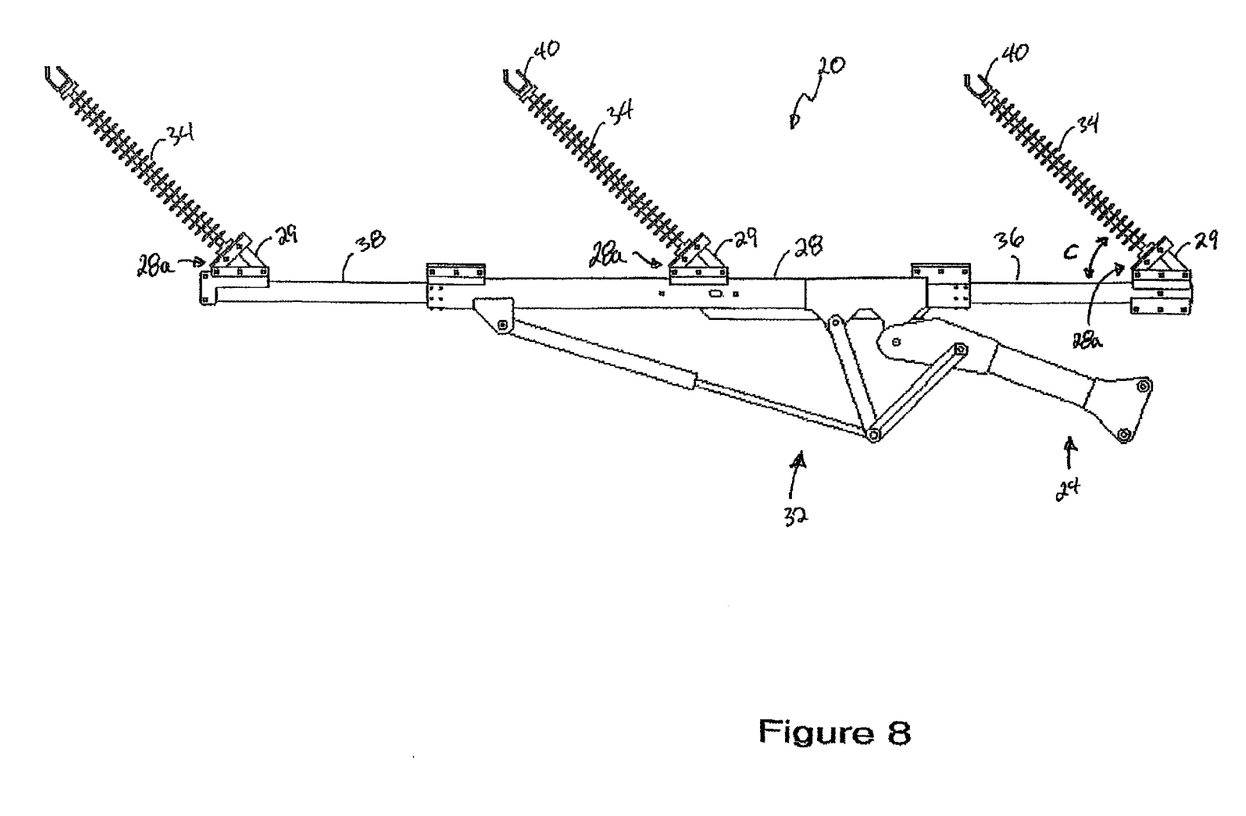
FIG. 8 is the boom mountable robotic arm of FIG. 7 wherein the static picks have been removed and the insulators rotated in a first direction by pinning first ends of their hinges and tilting the insulators about the pinned first ends and bracing the separated second ends of the hinges with rigid links to fix the angular inclination of the insulators relative to the arm.
Figure 9A:
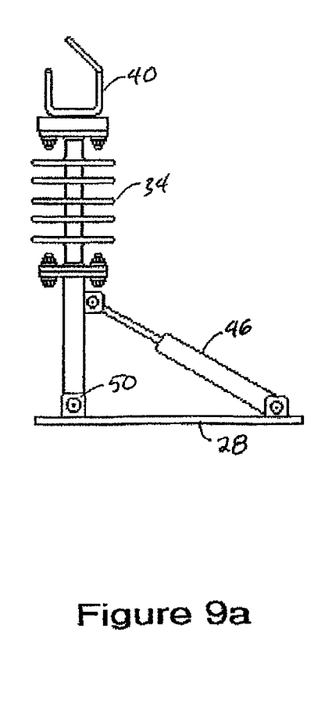
FIG. 9a is, in side elevation view, an alternative embodiment of a means for selectively inclining an insulator mounted onto the beam, wherein an actuator mounted to the beam selectively rotates the insulator about a pivot, wherein the insulator is shown extending perpendicularly from the beam.
Figure 9B:
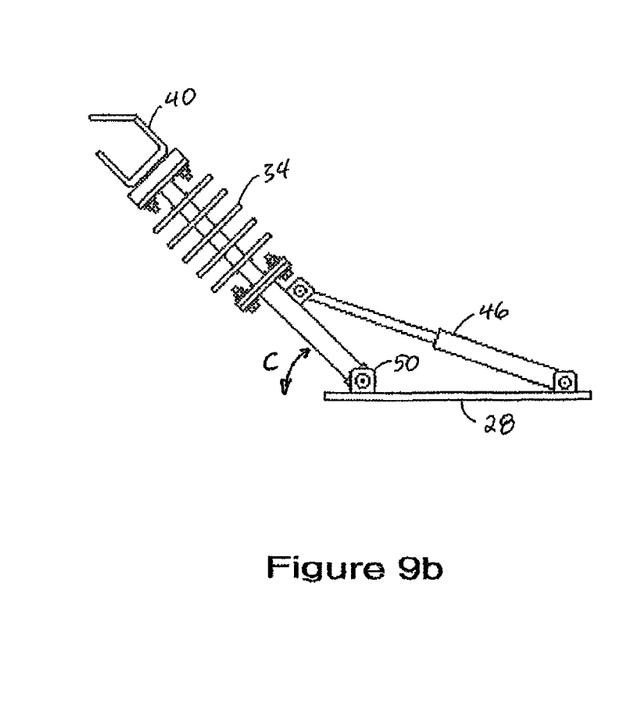
FIG. 9b is the view of FIG. 9a with the actuator extended and the insulator thereby pivoted about the pivot on the beam.
Figure 10A:
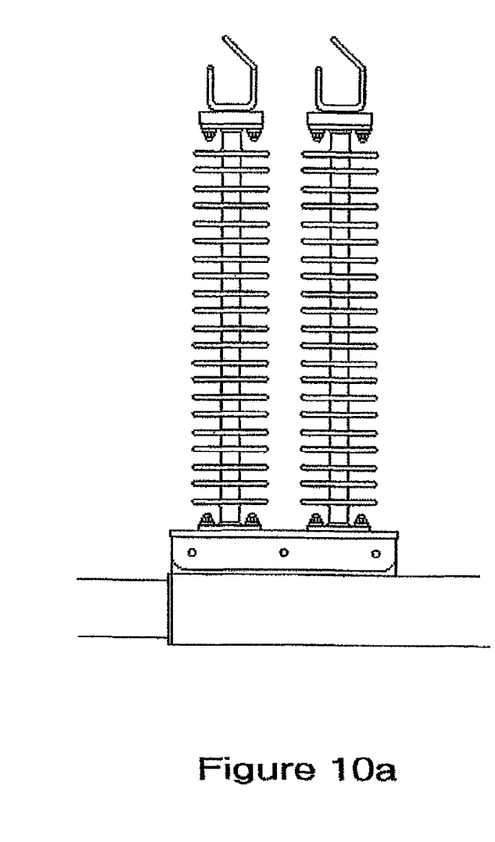
FIG. 10a is, in side elevation view, a pair of insulators mounted on a hinge which is mounted on one end of the beam, wherein the hinge is in its closed position so that the insulators extend perpendicularly from the beam.
Figure 10B:
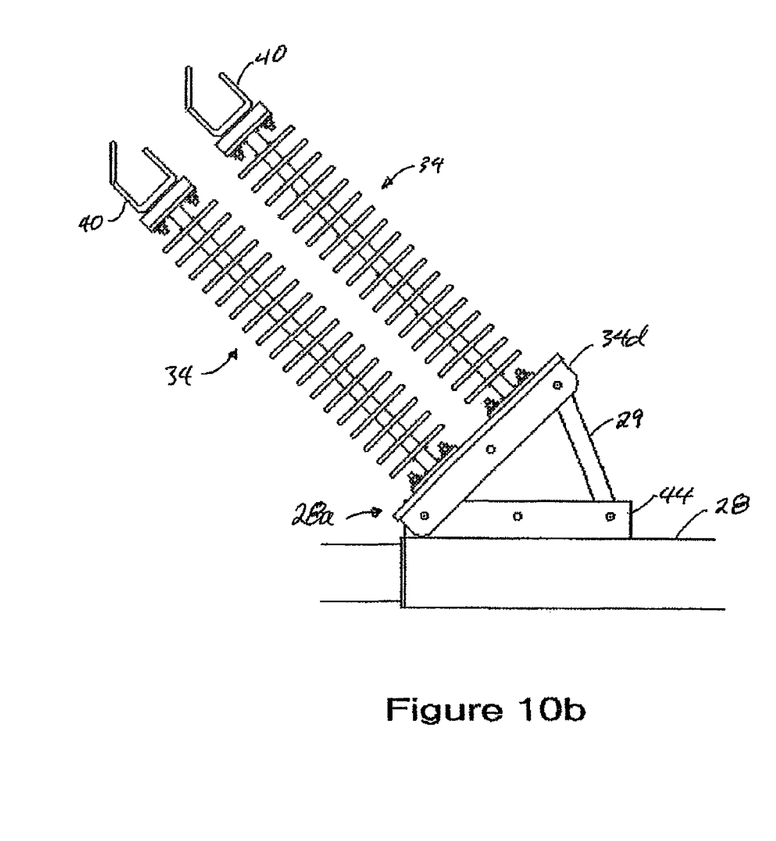
FIG. 10b is the view of FIG. 10a wherein the hinge has been pivoted about a first pinned end and the open second ends of the hinge braced by a rigid link so as to incline the insulators relative to the beam.
Figure 11:
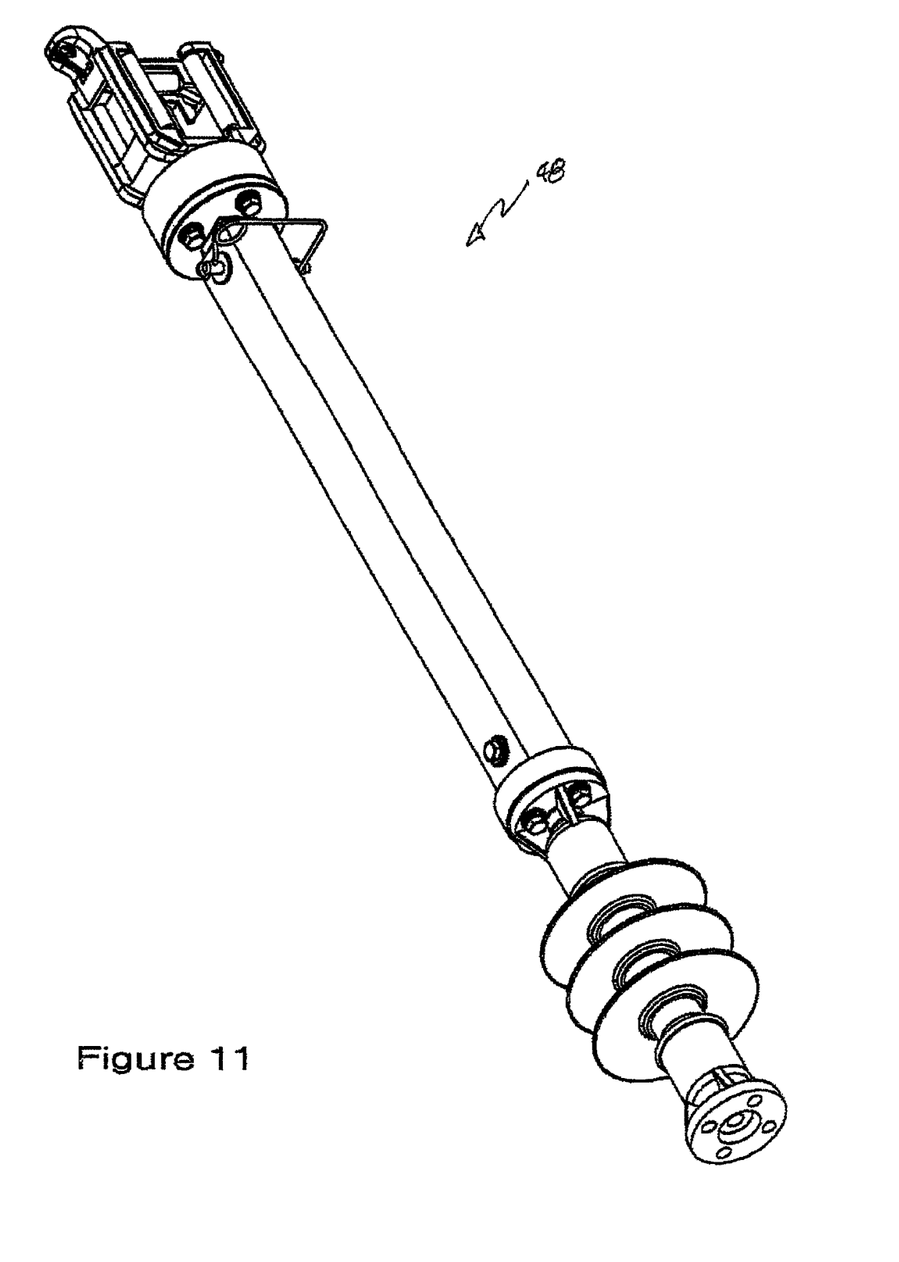
FIG. 11 is, in perspective view, a static pick such as seen in FIG. 6.

FIGS. 4 and 5 show upper frame 28 in a horizontal position such as would be used to pick-up horizontally spaced apart conductors. FIG. 5 shows the use of optional rigid extension members 46 mounted in oppositely disposed co-axial alignment to the opposite ends of telescoping arms 36, 38 or of upper frame 28 when arms 36, 28 are not employed. Insulators 34 are mounted at are mounted at the outermost ends of the extension members to provide for situations where the spacing between conductors in larger than the extendable range of telescoping arms 36 and 38 at their maximum extension from upper frame 28, including the extra range afforded by angling insulators 34 outwardly of the ends of the beam.

Static picks 46 may be mounted to the main beam or upper frame 28 between the support posts or insulators 34 so as to extend substantially perpendicularly from the beam, and may also be mounted by second rotation couplings such as hinges 28a to, for example, pivot along the beam.

Angular positioners such as actuators 46 may be mounted acting between the posts 34 and/or picks 48 for adjusting the inclination angle C of the posts or picks about the second rotation coupling on the beam. The angular positioners may be rigid positioners for example using links 29 of different lengths to selectively tip or pivot the posts or picks about their hinges 28a by set angles C such as for example 15°, 30°, 45°, etc.

Alternatively, instead of the use of links 29 holding the hinges open, that is, mounted between the open ends of the open hinges i.e. between the ends of hinge plates 44 and base ends 34d, the hinges may be selectively pivoted between their open-most and their closed positions, or otherwise the posts or picks may pivoted about their second rotational couplings. The second rotationally couplings may also include pinned joints, rotational sleeves, shafts and bearings, universal joints, ball-joints, etc (not shown) as would be known to those skilled in the art. Actuators 46 may be for example hydraulic cylinders cooperating between the posts or picks and the beam.

In the various embodiments, the support posts 34 may be single support posts 34 mounted one post per hinge 28a or pivot, or the support posts 34 may be multiple support posts, for example, pairs of support posts mounted one pair or group of support posts per hinge 28a or pivot.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A boom mountable robotic arm for temporarily supporting one or more energized electrical conductors comprising:
   a single elongate unitary beam adapted for coupling with an upper end of a boom,
   a boom adaptor mountable to said upper end of the boom,
   at least one electrically insulated support post coupled to said beam, each post of said at least one electrically insulated support post adapted for temporarily supporting an energized electrical conductor,
   at least two rotation couplings for selectively controllable rotation of said beam and said at least one electrically insulated support post about at least two corresponding axes of rotation,
   wherein a first axis of rotation of a first corresponding rotation coupling of said at least two rotation couplings is chosen from the group comprising: a) at least one axis of rotation extending substantially along a longitudinal axis of said beam, for rotation of said at least one electrically insulated support post relative to and substantially laterally of said beam, b) at least one axis of rotation extending substantially laterally across said beam at base ends of said at least one electrically insulated support post for rotation of said at least one electrically insulated support post relative to and substantially along said beam, whereby said at least one electrically insulated support post is selectively adjustable between a retracted position substantially laid flush along said beam and a pick-up position ready to receive a conductor being supported,
   and wherein a second axis of rotation of a second corresponding rotation coupling of said at least two rotation couplings extends laterally of and between said beam and the upper end of said boom for rotation of said beam relative to said boom in a substantially vertical plane;
   and wherein said beam is an elongate upper beam assembly rotatably mounted to said boom adaptor for rotation of said upper beam assembly about said second axis of rotation relative to said boom,
   and wherein said second corresponding rotation coupling includes a selectively actuable first actuator mounted between said upper beam assembly and said boom adaptor for selectively adjusting an angular position of said upper beam assembly relative to said boom adaptor,
   and wherein said selectively actuable first actuator is mounted so as to cooperate between said beam and a scissor linkage mounted to said beam and said boom adaptor for selectively adjusting an angular position of said beam relative to said boom adaptor wherein said scissor linkage includes first and second linear members, each said first and second linear members having, respectively, opposite first and second ends, said first ends of said first and second linear members pivotally connected to one another, said second ends of said first and second linear members pivotally mounted to, respectively, said beam and said boom adaptor, said first actuator pivotally mounted at a first end thereof to said first ends of said first and second linear members, and a second end of said first actuator, opposite said first end of said first actuator, mounted to said beam.

2. The boom mountable robotic arm of claim 1 wherein the said first axis of rotation of said first corresponding rotation coupling of said at least two rotation couplings is a substantially vertical axis of rotation orthogonal to said beam and extending substantially along a longitudinal axis of said support post, for rotation of said at least one electrically insulated support post about said substantially vertical axis of rotation.

3. The boom mountable robotic arm of claim 1 wherein said beam is pivotable in an angular displacement about said second rotation coupling by substantially 160 degrees relative to said boom adaptor, and wherein said angular displacement includes a substantially horizontal orientation and a substantially vertical orientation.

4. The boom mountable robotic arm of claim 3 wherein said beam includes telescopic beam extensions and a second actuator cooperating between said beam and said beam extensions for selective lengthening of said beam, and wherein said support posts are mounted on distal ends of said beam extensions.

5. The boom mountable robotic arm of claim 1 wherein said at least one electrically insulated support post includes at least two electrically insulated support posts coupled to and spaced apart along said beam.

6. The boom mountable robotic arm of claim 5 wherein said beam is a substantially linear beam and wherein said at least two electrically insulated support posts include a pair of insulated support posts mounted one on each of opposite ends of said beam on a corresponding pair of said first rotation couplings on said opposite ends of said beam, said first rotation couplings having corresponding substantially parallel said first axes of rotation allowing distal ends of said pair of support posts, distal from said beam, to rotate in a substantially vertical plane into said retracted positions.

7. The boom mountable robotic arm of claim 6 wherein said first rotation couplings each include a pivotal coupling mounted to said beam.

8. The boom mountable robotic arm of claim 7 wherein said pivotal coupling includes a hinge.

9. The boom mountable robotic arm of claim 8 wherein each said hinge includes at least one hinge plate, each said hinge plate having a plurality of bores therein for securing a corresponding said pair of electrically insulated support posts thereto.

10. The boom mountable robotic arm of claim 9 wherein said hinge includes a hinge plate having a fastener for securing said at least one hinge plate in an operating position in which said electrically insulated support posts extend in said pick-up position and substantially perpendicularly away from said beam.

11. The boom mountable robotic arm of claim 1 wherein said beam includes a main beam member and an extension member at least one end of said main beam member, said extension member extending so as to elongate said beam, and wherein said at least one electrically insulated support post is mounted on a distal end of said extension member, distal from said main beam member.

12. The boom mountable robotic arm of claim 11 wherein said extension member at least one end of said main beam member includes an oppositely disposed pair of said extension members, and wherein at least one of said at least two includes a pair of insulated support posts, and wherein at least one of said pair of insulated support posts is mounted at said distal end of each said extension member.

13. The boom mountable robotic arm of claim 12 wherein said extension members extend from a collapsed position to an extended position, and wherein said pair of support posts on said distal ends of said extension members pivot on their corresponding said first rotation couplings so as to fold along said main beam member when said extension members are in said collapsed position.

14. The boom mountable robotic arm of claim 13 wherein said extension members are telescopically mounted within said main beam member, and wherein said pair of support posts on said distal ends of said extension members pivot towards one another when pivoted about said first rotation couplings into said retracted positions.

15. The boom mountable robotic arm of claim 14 wherein a third said support post is mounted on said main beam member, and wherein said third support post is pivotable about a corresponding first rotation coupling so as to lay flush along said main beam member when in said retracted position, and when in said retracted position said third support post is substantially co-linearly aligned with and between said first and second support posts when in their corresponding said retracted positions.

16. The boom mountable robotic arm of claim 13 wherein said main beam member has opposite first and second ends at distal ends thereof and defined a beam length there-between, and wherein said second rotation coupling is adjacent said first end of said main beam member, and wherein said second end of said first actuator is mounted adjacent to said second end of said main beam member.

17. The boom mountable robotic arm of claim 16 wherein said first actuator selectively extends between a shortened length and a long length corresponding to retraction and extension of said first actuator respectively, and wherein said first and second linkage members have corresponding first and second lengths, and wherein said first or second lengths of said first and second linkage members summed with said shortened length of said first actuator, is substantially no longer than said beam length.

18. The boom mountable robotic arm of claim 16 wherein, when said first actuator is said retracted into said shortened length, said first actuator pulls on said first ends of said first and second linkage members so as to reduce an included angle between said first and second linkage members to thereby rotate said second end of said main beam member towards said boom adaptor.

19. The boom mountable robotic arm of claim 18 wherein said boom adaptor is elongate and wherein first and second included angles are formed between said first end of said main beam member and said boom adaptor and between said second end of said main beam member and said boom adaptor respectively, and wherein said first included angle is increased and said second included angle is decreased as said second end of said main beam member said rotates towards said boom adaptor.

20. The boom mountable robotic arm of claim 19 wherein when said first actuator is in said retraction and thereby in said shortened length, said included angle between said first and second linkage members is minimized and said main beam member is rotated about said first rotation coupling so as to be substantially flush along said linkage members, said first actuator, and said boom adaptor, whereby said beam and said support posts may be compactly stowed when the boom is in a lowered position.

21. The boom mountable robotic arm of claim 1 wherein said second corresponding rotation coupling is a pivotal coupling between said upper beam assembly and said boom adaptor for pivoting of said upper beam assembly and said at least one electrically insulated support post mounted thereon relative to said boom adaptor about said substantially vertical axis of rotation, wherein said upper beam assembly and said pivotal coupling further comprises a base member and a rotatable member operable to support said electrically insulated support posts, said base member having first and second spaced apart end connections and an upwardly disposed pivot platform therebetween, said pivot platform pivotally supporting said rotatable member thereon, wherein rotation of said rotatable member selectively orients said at least one electrically insulated support post relative to said base member.

22. The boom mountable robotic arm of claim 1 wherein said first corresponding rotation coupling includes a second actuator cooperating between said upper beam assembly and said at least one electrically insulated support post for selective inclination of said at least one electrically insulated support post relative to said upper beam assembly.

23. The boom mountable robotic arm of claim 22 wherein said electrically insulated support post includes an insulated upright portion and a riser portion, said riser portion having a first end pivotably connected to said upper beam assembly and a second end supporting said insulated upright portion, and wherein said second actuator angularly extends from said second end of said riser portion to said upper beam assembly.

24. The boom mountable robotic arm of claim 22 wherein said second actuator includes an insulated portion and a lengthwise extendable portion, said second actuator angularly extending between a distal end of said insulated support post and said upper beam assembly.

25. The boom mountable robotic arm of claim 1 further comprising an interruptible conductor having first and second ends and a plurality of electrically insulated support posts supporting said interruptible conductor away from said manipulator arm, wherein a rotatable electrically insulated support post of said at least one electrically insulated support post is rotatable relative to said upper beam assembly.

26. The boom mountable robotic arm of claim 25 wherein said selectively interruptible conductor comprises a stationary conductor between free distal ends of first and second posts of said at least one electrically insulated support post and a rotatable conductor extending from said free distal end of said second post and being selectively connectable to a distal end of a third post of said at least one electrically insulated support post.

27. The boom mountable robotic arm of claim 1 further comprising a base member mountable to a distal end of one of said at least one electrically insulated support post and a pivotable support plate pivotally mounted on said base member, said pivotable support plate adapted for mounting at least one electrical conductor retainer thereto.

28. The boom mountable robotic arm of claim 27 wherein said pivotable support plate is adapted for pivotally supporting said at least one electrical conductor retainer thereon for rotation of said at least one electrical conductor retainer relative to said pivotable support plate.

* * * * *